A. H. HINDLE.
ROLLER BEARING.
APPLICATION FILED AUG. 28, 1918.
1,356,766.
Patented Oct. 26, 1920.
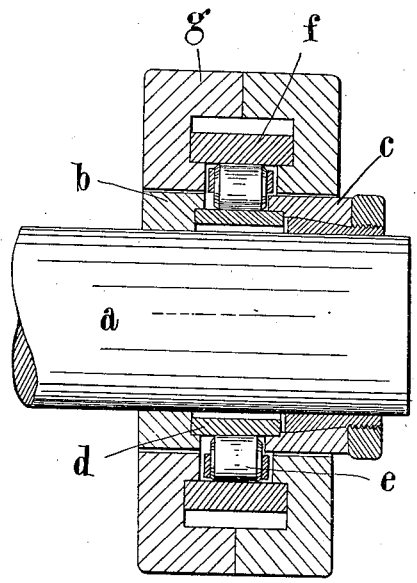
INVENTOR
A. H. Hindle
BY H. R. Kerslake
ATTORNEY

UNITED STATES PATENT OFFICE.

ALFRED HAROLD HINDLE, OF BROOKLANDS, ENGLAND.

ROLLER-BEARING.

1,356,766.  Specification of Letters Patent.  Patented Oct. 26, 1920.

Application filed August 28, 1918. Serial No. 251,725.

*To all whom it may concern:*

Be it known that I, ALFRED HAROLD HINDLE, a subject of the King of Great Britain and Ireland, and resident of 23 Glenthorn Grove, Brooklands, in the county of Chester, England, have invented certain new and useful Improvements in Roller-Bearings, of which the following is a specification.

This invention relates to bearings, fitted with rolling elements, either balls or rollers, and comprises improved means, as hereinafter described, for providing for the yielding of the said rolling elements when in service to insure free running and for the absorption of shocks due to suddenly applied loads or like causes.

The accompanying drawing illustrates, in sectional elevation, one convenient type of roller bearing constructed in accordance with this invention.

On the shaft $a$ is mounted, in any convenient manner, the fixed collar $b$ and the detachable collar $c$. Between the said collars there is disposed the ring or tube $d$ which forms the inner race ring or part for the rollers as $e$; the outer race ring or part is provided by the ring or tube $f$. The ends of the inner ring $d$ are supported by the socket-like portions of the collars $b$ and $c$ which embrace the said ends, while the ends of the outer ring $f$ are supported by projections from the inner surfaces of the housing $g$ of the bearing which enter the said ring ends as shown. When thus supported at their ends while their central portions are enabled to yield or deflect, after the manner of a bridge or the like, the said rings or tubes have sufficient resiliency to accommodate themselves to slight irregularities in the rolling elements and thereby insure free or smooth running with the capacity for absorbing shocks.

The housing $g$ of the bearing is made up from two or more parts bolted or otherwise held together in any convenient and ordinary manner.

Having now described my invention what I claim as new and desire to secure by Letters Patent is:

In bearings, the combination with the shaft and the bearing housing, of inner and outer cylindrical rings, rolling elements between the said rings, annular projections from the said housing entering the ends of the said outer ring, a fixed collar and a detachable collar on the said shaft, and sockets in the said collars embracing the ends of the said inner ring, as set forth.

In testimony whereof I have signed my name to this specification.

ALFRED HAROLD HINDLE.